US008412657B2

(12) United States Patent
Grenier et al.

(10) Patent No.: US 8,412,657 B2
(45) Date of Patent: Apr. 2, 2013

(54) CLASSIFICATION OF DIGITAL CONTENT BY USING AGGREGATE SCORING

(75) Inventors: Pierre Grenier, San Francisco, CA (US); Eddie Lo, Daly City, CA (US); Satinderpal Sandhu, Fremont, CA (US)

(73) Assignee: Lithium Technologies, Inc., Everyville, CA (US)

( * ) Notice: Subject to any disclaimer, the term of this patent is extended or adjusted under 35 U.S.C. 154(b) by 0 days.

(21) Appl. No.: 13/167,482

(22) Filed: Jun. 23, 2011

(65) Prior Publication Data
US 2012/0158632 A1    Jun. 21, 2012

Related U.S. Application Data

(63) Continuation of application No. 11/971,856, filed on Jan. 9, 2008, now Pat. No. 7,979,369.

(51) Int. Cl.
G06F 15/18  (2006.01)
G06F 7/00   (2006.01)

(52) U.S. Cl. .............................. 706/20; 706/18; 707/737

(58) Field of Classification Search .................... 706/20
See application file for complete search history.

(56) References Cited

PUBLICATIONS

Hu et al., Recognition of Pornographic Web Pages by Classifying Texts and Images. IEEE Transactions on Pattern Analysis and Machine Intelligence, vol. 29, No. 6 [online], Jun. 2007 [retrieved on May 18, 2012]. Retrieved from the Internet:<URL:http://ieeexplore.ieee.org/stamp/stamp.jsp?arnumber=04160952>.*
Arentz et al., Classifying offensive sites based on image content [online], Computer Vision and Image Understanding 94, 295-310, 2004 [retrieved Nov. 17, 2010]. Retrieved from the Internet:< URL:http://citeseerx.ist.psu.edu/viewdoc/download?doi=10.1.1.101.1532&rep=rep1&type=pdf>.*

* cited by examiner

*Primary Examiner* — Alan Chen
*Assistant Examiner* — Nathan Brown, Jr.
(74) *Attorney, Agent, or Firm* — Trellis IP Law Group, PC

(57) ABSTRACT

Aggregate scoring is used to help classify digital content such as content uploaded to multi-user websites (e.g., social networking websites). In one embodiment, specific categories are used that relate to a social implication of content. For example, text, images, audio or other data formats can provide communication perceived to fall into categories such as violent, abusive, rights management, pornographic or other types of communication. The categories are used to provide a raw score to items in various groupings of a site's content. Where items are related to other items such as by organizational, social, legal, data-driven, design methods, or by other principles or definitions, the related items' raw scores are aggregated to achieve a score for a particular grouping of items that reflects, at least in part, scores from two or more of the related items.

26 Claims, 6 Drawing Sheets

CLASSIFICATION OF DIGITAL CONTENT BY USING AGGREGATE SCORING

BACKGROUND

Continued increase in the popularity of online community data has created both benefits and problems. Online "social networking" sites of millions of users allow the users to post or upload content for other users to view, copy, modify, criticize or otherwise use or manipulate. Thus, each social networking site can act as a valuable resource for people to maintain business or social contacts, exchange information and ideas, provide resources for education, commerce or entertainment, or to provide other benefits.

However, operators of social networking sites are often concerned with the type or quality of content that is uploaded by the site's user base. Some types of content are deemed unsuitable or objectionable for the site's users, such as where the user base includes children. Other content may not achieve a desired level of quality or relevancy to a theme or goal of a site. The more popular a social networking site is, the harder it is to police content due to the sheer volume of new content posted each day, and due to the many different and sometimes subtle forms that content can have. But if the site operator is not effective in policing the site's content, the effect on its user base can be harmful.

SUMMARY

A preferred embodiment of the invention uses aggregate scoring to help classify digital content such as content uploaded to multi-user websites. Although specific embodiments of the invention are discussed, many other embodiments using features described herein are possible and may be within the scope of the invention. For example, the desirability to effectively review and filter content can extend to many types of information exchanges that are available online. Newsgroups, chat rooms, bulletin boards, wikis, peer-to-peer networks, etc., may benefit from improvements in identification, classification and/or control of content.

In one embodiment, specific categories are used that relate to a social implication of content. For example, text, images, audio or other data formats can provide communication perceived to fall into categories such as violent, abusive, rights management, pornographic or other types of communication. The categories are used to provide a raw score to items in various groupings of a site's content. Where items are related to other items such as by organizational, social, legal, data-driven, design methods, or by other principles or definitions, the related items' raw scores are aggregated to achieve a score for a particular grouping of items that reflects, at least in part, scores from two or more of the related items.

In one embodiment the invention provides a method for classifying digital content, wherein the digital content includes two or more items, the method comprising: identifying a grouping of the two or more items in the digital content; assigning a raw score to the identified items based on predetermined criteria; deriving an aggregate score for the digital content, wherein the aggregate score is derived from the raw scores; and using the aggregate score to output a classification of the digital content.

DETAILED DESCRIPTION

Figure 1:
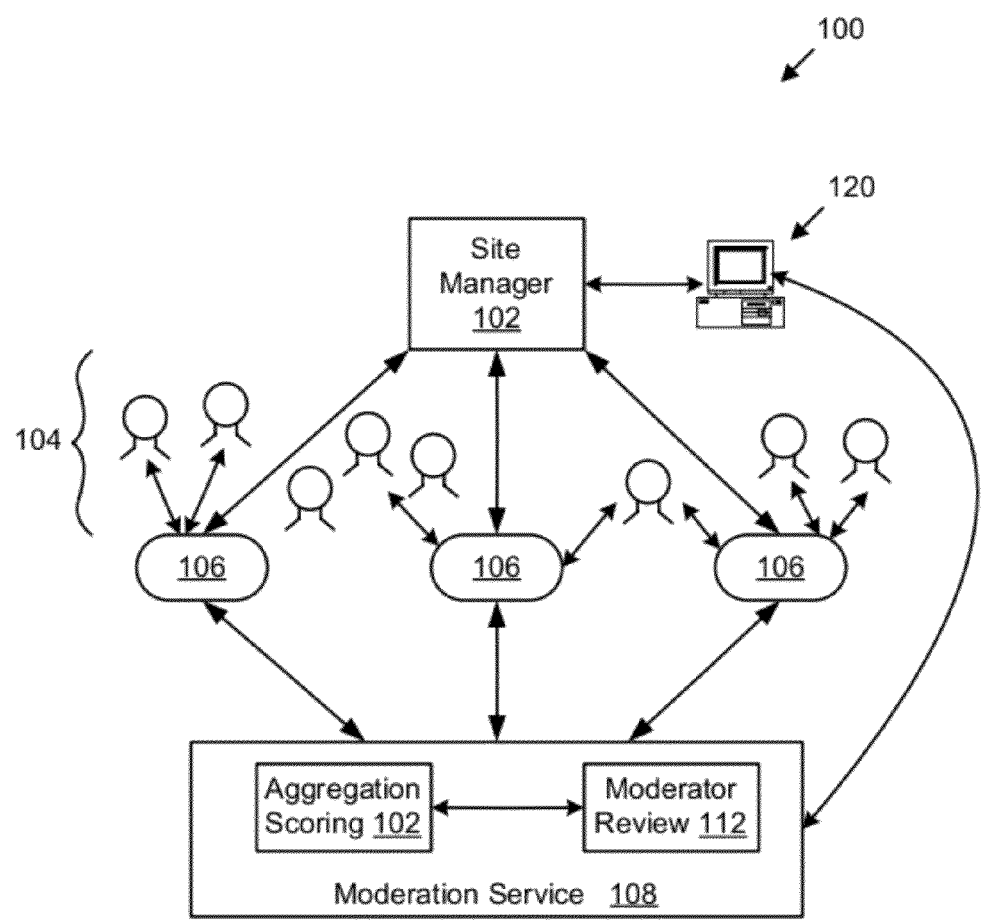
FIG. 1 is a basic diagram showing principal entities and processes in a system for practicing embodiments of the invention.

FIG. 1 shows principal entities and processes in a system for practicing embodiments of the invention in an example application of a social network website. System 100 includes site manager 102 that can be a person, business entity (e.g., corporation, partnership, etc.), automated process or other entity or combination of entities that manages and operates a social networking website. Any number of users 104 can create and access content that exists in domains 106.

Information about content in the domains is provided to moderation service 108. Moderation service 108 uses automated analysis such as aggregation scoring 110 and manual review 112 in order to provide classification of the content and identification and/or removal of objectionable content. In a preferred embodiment, site manager 102 is able to use an interface such as customer console 120 to set threshold levels to determine when content is classified as objectionable.

Note that in general any number, type and arrangement of components shown in FIG. 1 can be used in different embodiments. For example, a different application may have the content organized in "pages," "accounts," or other structures than "domains." In some social networking sites users have individual storage space for content that "belongs" to a user (i.e., is generally under a user's control) and there may be various different ways for the controlling user to present the controlled content to other users. It should be apparent that any suitable way to organize and present content may be within the scope of the invention.

In other embodiments, a unified approach to content management can be used so that, for example, site manager 102 and moderation service 108 are the same entity. Components can be combined so that, for example, site manager 102 and moderation service 108 are the same entity. In other embodiments, functionality described in association with moderation service 108, may be provided to one or more of users 104. Such user moderation can be under the control of other entities such as site manager 102 and/or moderation service 108. In yet other embodiments, additional entities not shown in FIG. 1 can be included, as where portions of moderation service 108 are performed remotely (e.g., outsourced human or automated resources, etc.).

Although specific components and data flow are illustrated in FIG. 1, other embodiments may deviate from this illustration. In general, functionality described herein can be performed at any suitable location, by any suitable process or device, and under the control of one or more entities. Implementation of functionality can take place at different times or places. For example, processing can be performed in real-time, near real-time, scheduled (e.g., offline, batch processed, etc), or by other means. Processing can be distributed, standalone, parallel, etc. It should be apparent that many variations from the specific embodiments disclosed herein in the text and Figures are possible and are within the scope of the claims.

Figure 2:
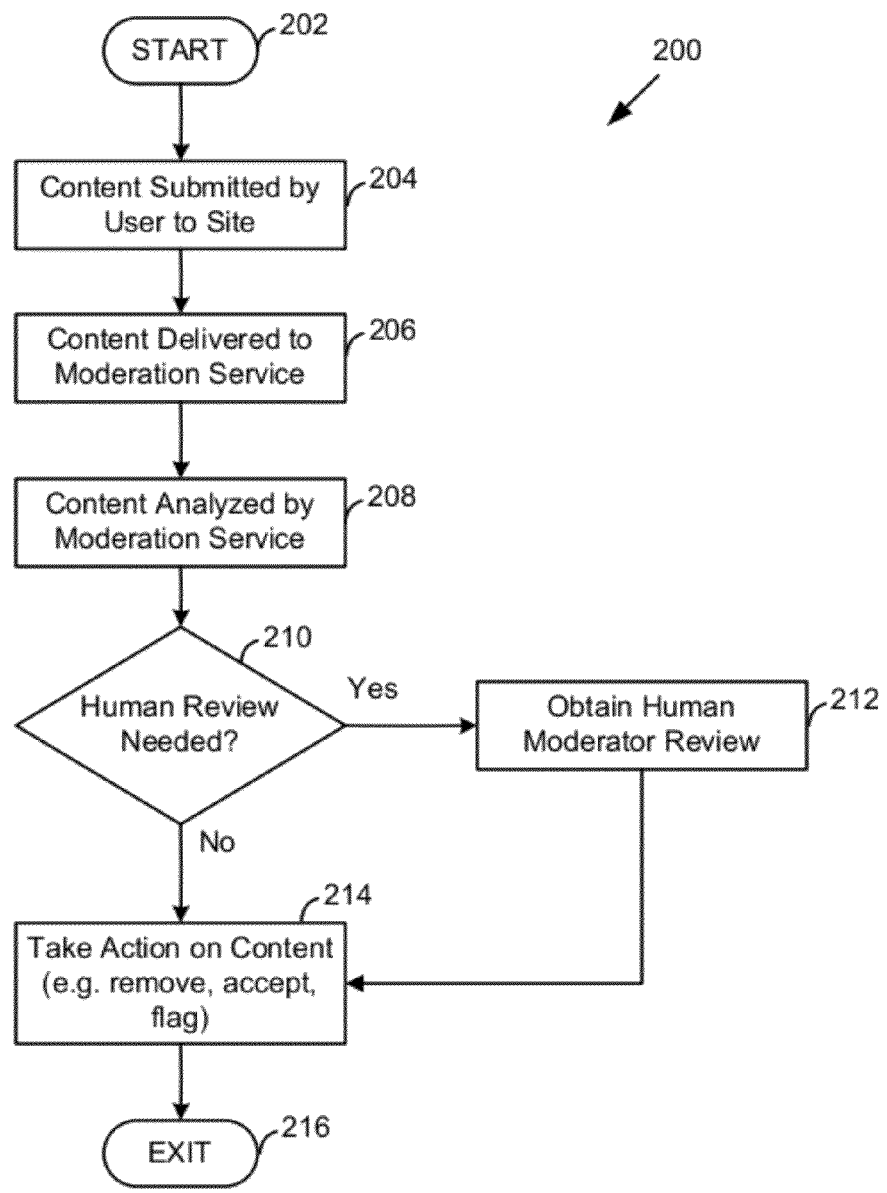
FIG. 2 shows a flowchart illustrating basic steps in a routine to classify and filter content.

FIG. 2 shows flowchart 200 that illustrates basic example steps in a routine to classify and filter content.

In FIG. 2, flowchart 200 is entered at 202 when content is submitted by a user, such as when a user uploads or posts information to a social or multi-user website. Step 206 is then executed to deliver the content to moderation service 108. The user content can be provided to the moderation service by, for example, site manager 102. Alternatively, the content may be obtained from the user or site storage location directly, such as where an automated process installed and/or maintained by the site manager, user, moderation service or another entity or process (not shown), detects when new content is provided or when existing content changes and identifies or transfers the new content to the moderation service.

Step 208 is then executed by the moderation service to perform an automated assessment of the content, such as to provide aggregate scoring and classification as described, below. If it is determined that human review is needed to classify the content then step 212 is executed and, subsequently, execution proceeds to step 214. However, if human review is not needed then step 214 is performed directly to take action on the content based on the automated, manual, or combination of automated and manual review. The routine exits at step 216.

Figure 3:
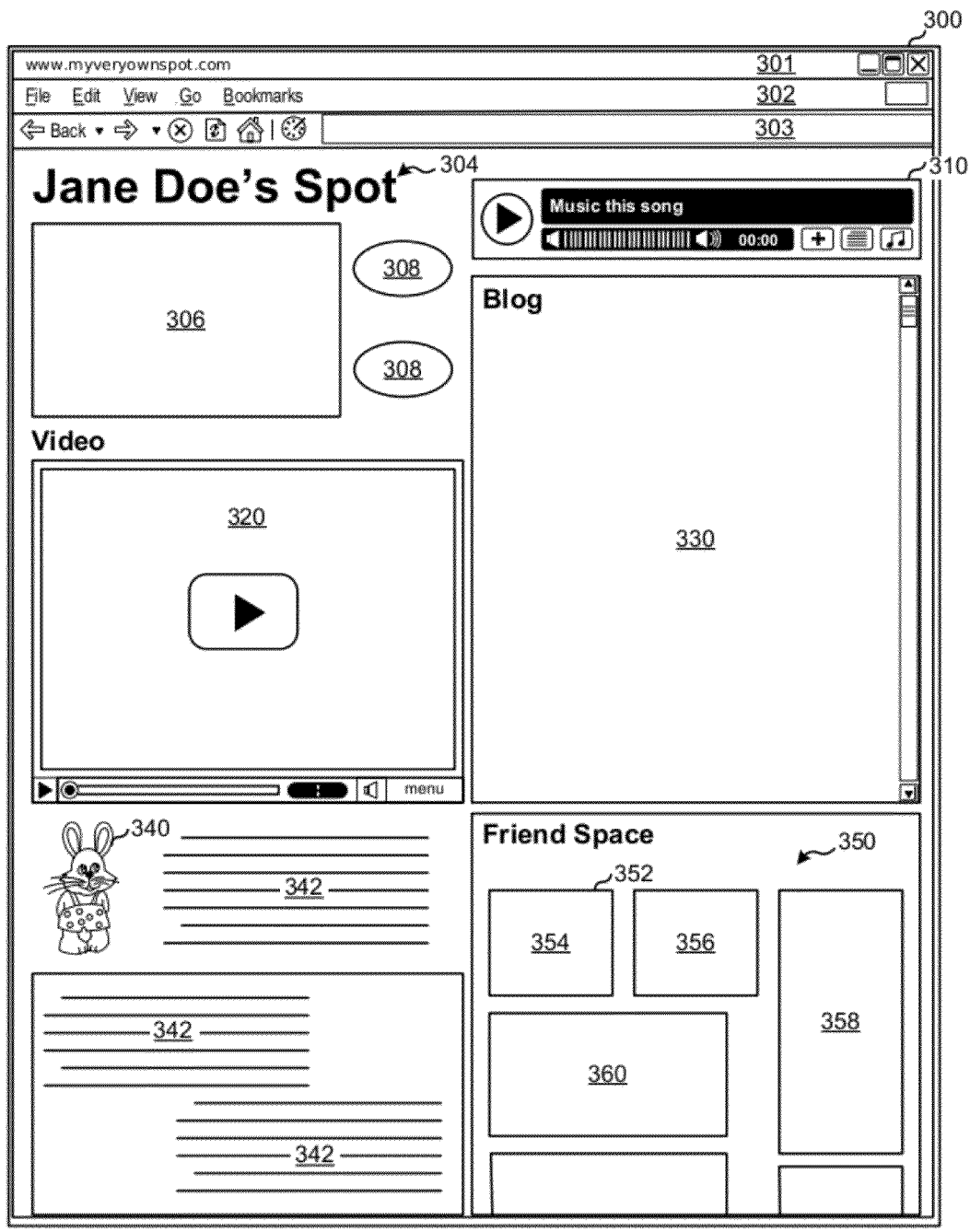
FIG. 3 illustrates an example web page displayed in a web browser such as may be encountered at a social networking site.

FIG. 3 illustrates an example web page displayed in a web browser such as may be encountered at a social networking site. Naturally, web pages or other groups of content can have many different designs, layouts, properties and components. FIG. 3 is merely an example to illustrate concepts of embodiments of the invention.

In FIG. 3, browser window 300 includes standard properties and controls such as the web page title 301, menu bars 302 and navigation controls 303. The web page content starts just below the navigation controls. At the top of the web page is the web page title, "Jane Doe's Spot," at 304 which identifies the user who typically has elevated control of the content on the page with respect to other users. The controlling user, or "owner," of the page, site, spot or other demarcation of a group of content can upload or post content that has various types of purposes and organization on the web page.

For example, picture 306 can be an image of the spot's owner. text 308 can be created by the owner or another user. music player 310 can allow the owner to select songs for audio playback. Other user's who visit the site can control playback among the owner's pre-selected songs.

Similarly, video player 320 allows the owner to select one or more videos for visiting user playback. Blog 330 allows the owner to make periodic "diary" entries. Other users may be permitted to post or upload to different component items on the page (e.g., to the pictures, text, players, blog, etc.). In general, different levels of access and control can be given to the owner and to visitors. This type of access and control granting is typically at the discretion of the site manager. In some applications it may be useful for the moderation service, or for other users, to be able to allow or deny levels of access and control to other users.

Yet other items on the web page include animated image 340 (e.g., an animated gif, video clip, etc.), text entries 342, separate space entitled "Friend Space" that allows visitors to have greater ability to post text and images such as 352 and 354-360, respectively. It should be apparent that any number, type or arrangement of web page items is possible. Typically, the design and purpose of the social networking site dictates the items and how they are used and controlled by the user community.

A preferred embodiment assigns raw scores to different content items. Collections or groupings of items that are useful to perform a content analysis are identified. For example, some useful groupings in a social networking application include a user upload or post, a web page, a site address or Uniform Resource Locator (URL), content associated with a user account, etc. An aggregate score for the item grouping is then determined by using two or more items in the grouping in order to derive, at least in part, the aggregate score.

In one embodiment, each item is given a raw score in each of several categories of interest. Categories can include one or more of the following:

1. Violent Material:

1.1. Violence

This category includes users that portray, describe or advocate physical assault against humans, animals, or institutions. Also included are depictions of torture, mutilation, gore, or horrific death, any sites advocating suicide or self-mutilation, and instructions. Sites with recipes or kits for making bombs or other harmful or destructive devices and excessive use of profanity or obscene gesticulation are also included in this category.

1.2. Weapons

URLs/users in this category include sites such as online purchasing or ordering information, including lists of prices and dealer locations, any page or site predominantly containing, or providing links to, content related to the sale of guns, weapons, ammunition or poisonous substances and displaying or detailing the use of guns, weapons, ammunition or poisonous substances. (note: weapons are defined as something used to injure, defeat, or destroy, such as a club, knife, or gun).

2. Abusive Material 2.1. Cyberbullying

Cyberbullying includes sending or posting harmful or cruel text or images using the Internet or other digital communication devices. It includes, but is not limited to:

Sending cruel, vicious, and sometimes threatening messages;

Creating web sites that have stories, cartoons, pictures, and jokes ridiculing others;

Posting pictures of classmates online and asking students to rate them, with questions such "Who is the biggest _____ (add a derogatory term)";

Breaking into an e-mail account and sending vicious or embarrassing material to others;

Engaging someone in instant messaging (IM), tricking that person into revealing sensitive personal information, and forwarding that information to others;

Distributing or indicating an embarrassing picture of a person;

2.2. Hate Speech

This category can include sites or content advocating or inciting degradation or attack of specified populations or institutions based on associations such as religion, race, nationality, gender, age, disability, or sexual orientation. Also, sites that promote a political or social agenda that is supremacist in nature and exclusionary of others based on their race, religion, nationality, gender, age, disability, or sexual orientation. Holocaust revisionist/denial sites, coercion or recruitment for membership in a gang or cult and militancy, extremist sites are also included. Content that could be excluded from this category can be news, historical, or other factual reporting.

3. Spam

Spam relates to content which might be used for purposes other than those indicated in a site's terms of services or desired purpose. For example, offering services or selling products through messages may be considered spam. Another example of spam includes mass mailing or posting of comments on other members' sections.

4. Scams

Sites or individuals that provide work-arounds for filtering software, cracked software, pirated software, download sites and pirated multimedia download sites. Content that encourages a user to participate in a "con" or fraud scheme to obtain money or other things of value from the user.

5. Pornography/Sex

This category includes content, users and other entities that reference, discuss, or show sexually oriented or erotic full or partial nudity, depictions or images of sexual acts that may be undesirable for a site. Content can be text, images, video, audio or otherwise. References or links to places where such content may be obtained can also fit this category. For example, references to adult products, digital versatile disks (DVDs), websites, videoconferencing, escort services, etc. can be included in this category.

6. Digital Rights

This category can include any content that is known, or likely, to be proprietary to a 3rd party and which is suspected or known to be used by a user in violation of the 3rd party's rights.

7. Other

Objectionable images such as those that detract from a site's aesthetic design. For example, a "blinky" is typically an image which includes lots of shiny pixels that some viewers may find annoying. Other types of objectionable images may include ones that don't fit a color scheme, are too large, depict unsettling or gross items, etc.

Figure 4:
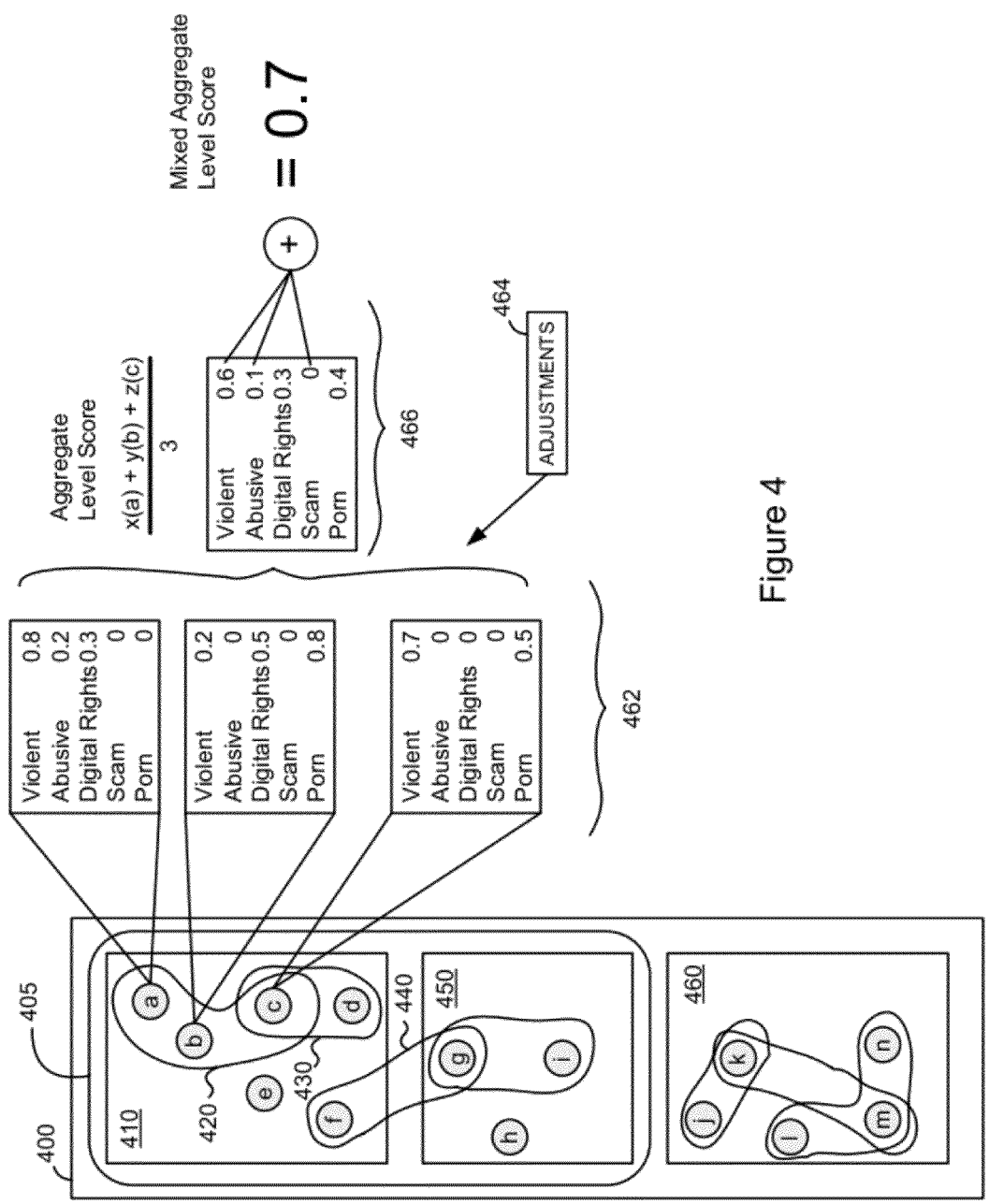
FIG. 4 shows basic concepts in aggregate scoring according to a preferred embodiment.

FIG. 4 shows basic concepts in aggregate scoring according to a preferred embodiment of the invention. In FIG. 4, site 400 includes web pages such as 410, 450 and 460. Content items are shown as circles with a letter inside. Each of content items a, b, c, . . . n can be part of a "level" or grouping. A grouping can be according to a web page, user post, user account, blog entry, etc. In FIG. 4, grouping 405 might be a web page that includes items a-f. Grouping 420 could be a post that has been uploaded to the web page and that uses items a, b and c that were uploaded as a group and may relate to each other For example, the items a, b and c might be an image, text and a link to another website, respectively. The text can describe the image and the other website may include more information relating to the image. Grouping 430 can be a blog entry by web page 410's owner that includes item d which was uploaded in the blog entry, or post. Grouping 440 can include two items f and g which are on two different web pages 410 and 450, respectively, but which belong to the same user's account as indicated by grouping 405. As mentioned above, items, groupings, entries, pages, posts, etc. can be of any desired type. In general, any suitable type or organization of items can be used.

In one embodiment, items are assigned raw scores for each of multiple categories of analysis being undertaken by the moderation service. In the example of FIG. 4, there are five categories of interest relating to Violence, Abusiveness, Digital Rights, Scams and Pornography shown at 462. Each category receives a score in the range 0 to 1, inclusive. The raw scores can be derived by manual or automated methods, or by a combination of manual and automated approaches. In a preferred embodiment, items to be assigned raw scores are identified by detecting changes to content at a site. Content changes can be identified by "spiders" or log agents maintained by the site manager or by the moderation service. An application programming interface (API) can be provided to third party developers and customers to allow information about content and content changes to be automatically provided by third parties. Other ways to identify content changes are possible. Another approach can use the user community to identify (e.g., by voting or flagging) content that may be of elevated interest for analysis. For example, if enough negative votes are submitted by the user community then an item or grouping may be submitted as a subject of analysis. The votes can also be used (alternatively or in combination with immediate moderator review) as part of the scoring and aggregation described herein.

This approach of identifying changed content helps to filter or reduce the amount of content that must be analyzed. In popular sites of millions or more users the amount of new content each day can be enormous. In future systems where resources such as processing cycles, memory, disk storage, etc., become faster and more plentiful it may be feasible to examine more content more often without a need for filtering or identifying content for analysis.

Adjustments 464 to the raw scores can be made based on different conditions. For example, if a particular item is associated with a grouping such as a web page, and that web page has received a high score (e.g., a high Mixed Aggregate Level Score as discussed below) this could indicate that all of the items in the web page are more likely to be objectionable. In such a case, all of the items in the particular web page may have their raw scores adjusted higher just because of the association of the item to the web page with a high score.

Another type of adjustment that can be useful is to associate users on the site who communicate frequently with each other. Sometimes such user associations can be determined by specific mechanisms maintained by a site. For example, a primary user may have other users that the primary user identifies as "friends" so that the friends may have more access to items or mechanisms on the primary user's page. The friends may be able to post video or look at certain sections of the primary user's site that are not available to non-friend users.

Another way to identify associated users is to assess the amount of traffic or exchanges between users. For example, if two users frequently send chat messages to each other or post to the same blog then those two users may be considered friends, or associated. Once user associations are identified then an item or grouping associated with a first user (e.g., a negative or positive raw score for the first user's page or account) can be used to adjust the scores of one or more associated users.

Note that any properties of an identified group or item can be used to adjust a specific item's score. For example, if a user is identified as having posted objectionable content (a "flagged" user), then groupings and items associated with the suspect user can be adjusted. This could include, e.g., web pages in the user's account, postings by the flagged user to any user's web page, pages that are linked from the flagged user's pages, etc. Also, such adjustments can be applied anywhere in the calculations described herein—not only to the raw scores shown at 462.

Once raw scores are assigned to items in a group (also referred to as a "level") then two or more of the items' raw scores are used to obtain a type of aggregate score referred to as an Aggregate Level Score (ALS) shown at 466. In FIG. 4, the ALS for grouping 420 is obtained by using each of the items in grouping 420—namely, items a, b and c. The ALS includes each category of interest for which a score was assigned as a raw score to an item. It should be apparent that many variations to compute the ALS are possible. For example, in other embodiments not all of the items in a grouping need be used in order to achieve an ALS. The ALS need not maintain all of the categories present in the raw scores. Some items in a grouping may have different categories of raw scores that are not present in all items in the grouping. Many other variations are possible.

In the example of FIG. 4, an example formula for deriving an ALS is shown as (x(a)+y(b)+z(c))/3. This illustrates weighting factors x, y and z each applied to the raw scores. The sum of the weighted raw scores is normalized by dividing the sum by the number of items. Operations such as weighting and normalizing are optional depending upon implementation. In the example, of FIG. 4, a weighting value of 1 is used (i.e., no weighting). Other modifications to the exact methods and formulas used to illustrate the invention are possible. For example, a change over time (first derivative) of a raw score, ALS or other measure or parameter can be used. Factors other than raw scores may be included in order to arrive at an ALS or other measurement. For example, geographic location, date, time of day, age, political affiliation, frequency of posting or accessing account, amount of traffic to a web page, or other demographic, statistic, measurement or parameter can be employed.

In a preferred embodiment, Weights are applied to the raw scores. The weighted raw scores are included in a mixed score where each classification may carry a different weight. Unlike the example of FIG. 4, the aggregation of mixed scores are not weighted and combined into a single value. Instead, the separate scores in the mixed score are maintained and analyzed separately throughout the system. Other characteristics of a preferred embodiment are as follows: (1) a higher score is used to indicate less desirable content; (2) each item's value has a lower threshold or base value of 0.2 so that a "perfectly clean" or acceptable item still gets a score of at least 0.2; (3) all text in an item is assigned a single score; and (4) adjustments may be made for statistical correction and accuracy such as standard deviation, as desired. For example, a customer may wish to add an additional penalty value to a score if the standard deviation for scores in that category are high. In other cases, anomalies may arise such as where a concentration of particular items with particular scores can produce an unwanted result. In such a case a deviation weight can be added to, or subtracted from, a score.

In a an alternative embodiment, two or more of the aggregate level scores are combined to obtain a Mixed Aggregate Level Score (MALS). The mixed aggregate level score is compared to a threshold. If the threshold is exceeded then the level may be escalated to higher scrutiny, such as by sending one or more items in the grouping with the high MALS to a human moderator for review, by flagging the items or grouping for further automated analysis, by removing items, or by taking other action.

In a preferred embodiment, the MALS scores are used to determine whether one or more items in a grouping with a high MALS is presented to a human moderator for physical review. Other systems can take other actions such as using further automated processing to identify or categorize content. If a human moderator determines that items or groupings are objectionable then the items or groupings can be immediately removed from the site ("blacklisted"), or quarantined so that other users can not access the content. Alternatively, if a human moderator determines that items or groupings are ok then the items or groupings can be approved ("whitelisted"). Such approved items can be given a unique ID (e.g., a hash of data included in an item). Items that have been previously approved can be removed from future analysis.

Where an item or grouping has been blacklisted or removed, other items, groupings, users, friends or other entities (e.g., a website linked with an item, a source of an item, etc.) associated with the blacklisted item can be adjusted so that their score(s) are affected by the association.

Figure 5:
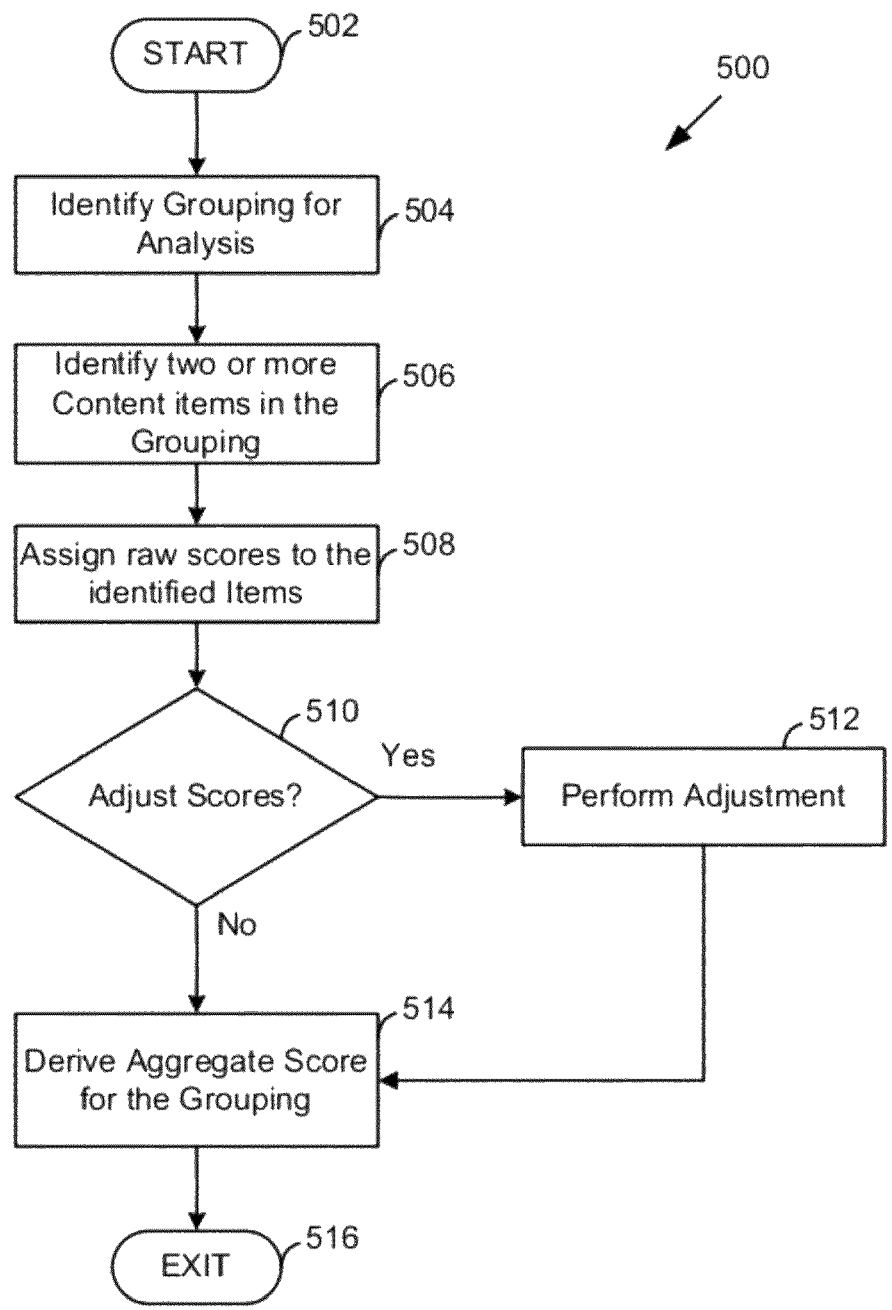
FIG. 5 shows a flowchart illustrating basic steps in a routine to derive an aggregate score.

FIG. 5 shows a flowchart illustrating basic steps in a routine to derive an aggregate score.

In FIG. 5, flowchart 500 is entered at step 502 when it is desired to classify content. Step 504 is executed to identify a grouping in the content for analysis. At step 506, two or more items in the grouping are identified. At step 508 raw scores are assigned to the items. Steps 510 and 512 are optionally executed if adjustments are possible to the raw scores. If it is determined at step 510 that scores should be adjusted (e.g., if an item or grouping is associated with an item, grouping, user or other entity under analysis) then step 512 is executed to perform the adjustment. Step 514 is executed to derive the aggregate score for the grouping by using the raw scores, or adjusted raw scores. Finally, the routing is exited at step 516.

Figure 6:
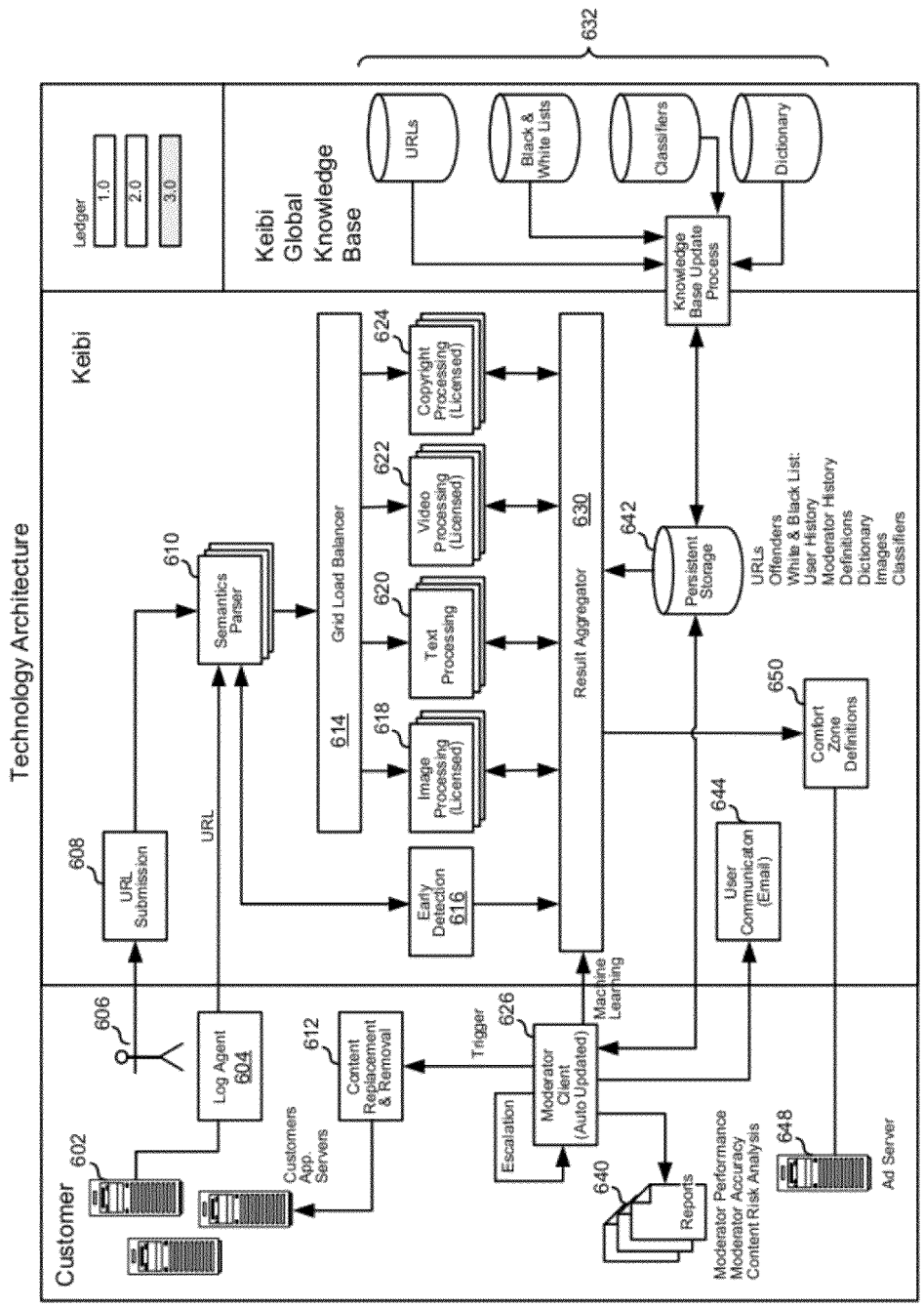
FIG. 6 is a block diagram that illustrates basic components in a system suitable for practicing embodiments of the invention.

FIG. 6 is a block diagram that illustrates basic components in a system suitable for practicing embodiments of the invention. Note that many other systems can be adaptable for use. Functionality of the invention may be provided from systems ranging from a single processor to multiple server farms of thousands or more computers. Components may be added to, removed from, or otherwise modified from those shown in FIG. 6 as FIG. 6 is merely a depiction of one type of generic system.

In FIG. 6, application servers (e.g., web page servers) 602 include content that is logged by log agent 604. Content submissions from users such as user 606 are provided to a URL or address (or other destination or storage/posting mechanism) as indicated at 608. Semantics parser 610 is an automated process that filters content. For example, keyword filtering of four-letter words can be implemented to immediately remove content from further analysis. Content coming from known approved sources can bypass analysis. Log agent 604 provides information about content traffic and updates to the semantics parser. If content can be identified by semantics parser 610 it is submitted to early detection process 616 for alternate processing.

Semantics parser 610 also makes a preliminary determination of content items for assignment for specific analysis. Grid load balancer 614 allocates content for analysis among different machines or processes in cases where a system may have multiple options to perform processing so that certain processors are not overloaded when there are other idle (or less busy) processors that can perform the tasks. Depending on the identifications made by the semantics processor and the load balancer's assignments, analysis for different formats or other categories of content is assigned to one of multiple analysis engines. In the example of FIG. 6, analysis engines include image processing 618, text processing 620, video processing 622 and rights processing 624. Any number, type, organization or arrangement of analysis engines may be used.

Results from the analysis engines are provided to result aggregator 630. In a preferred embodiment, this is where the processing of acts in FIG. 5 is performed to achieve an aggregate score. However, in other embodiments such processing can be performed by any one or more processing devices at the same or different places in a system. Results from aggregate scoring (and other analysis such as mixed level aggregate scoring) are stored in persistent storage 642 and are drawn upon for various types of processing. For example, previously calculated raw and aggregate scores for items or groupings may be stored and used for later computations.

Components 612, 626, 640 and 644 illustrate human moderator involvement to review and rate items and groupings dependent upon scores from result aggregator 630. Actions by human moderators (e.g., whitelisting, blacklisting) may also be used as input to result aggregator 630 to adjust or otherwise modify scores. In this illustrated embodiment, human moderators actions are used to remove content from servers 602 as shown at 612. Reports 640 help manage and improve the accuracy of human moderators. Such reports can be, for example, ranking of each moderator according to moderators' performance relative to other moderators. Email communication 644 can be used to contact users whose content has been modified.

Knowledge base 632 includes various resources to improve data for analysis. For example, URLs and items that were previously blacklisted or whitelisted can be stored. A dictionary of objectionable or acceptable terms can be maintained. Classifiers can include metadata about different items, groupings, users or other entities. Knowledge base data can be used to provide information to other components in the system to improve analysis based upon trends over time or other historical observations. Knowledge base 632 can include information from multiple websites or sources to correlate, for example, user account scoring across different enterprises or domains. Comfort zone definitions 650 can allow each domain/client to specify a tolerance level for a classification. Anything below (or, alternatively, above) the level is deemed acceptable. Ad server 648 can retrieve a score for an account or a page which can then be used in determining the type of ad to place on the page. For example, a user-generated page (UGP) can be analyzed and certified that there is no offensive content on the page. An advertiser who has negotiated placement of ads only on certified UGP can then have an ad placed on the page. In another approach, a certified ad can be selected for inclusion which will guarantee that the ad content meets a specific requirement or term of service. Scores can be used in other way to match ad content to a page such as indicating that the content should be appropriate to anyone over the age of 13, etc.

Although particular embodiments of the invention have been described, variations of such embodiments are possible and are within the scope of the invention. For example, although embodiments have primarily focused on removing objectionable content it is possible to use features of content classification described herein to identify desirable content. Any type of scoring or ranking measure may be used. Scores may be integers, fractions, multidimensional sets of values, attribute names, symbols, etc. Although web page examples and social networking sites have been presented, features of the invention may be applied to other types of information such as databases that use files, records, fields and other groupings of their items.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. For example, distributed, networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A method for classifying digital content uploaded to the user base of a social networking site by users of the social networking site, wherein the digital content includes two or more items, the method comprising:
   identifying, using a data processor, a grouping of the two or more items in the digital content associated with a primary user of the social networking site;
   assigning, using the data processor, a raw score to the identified items based on predetermined criteria;
   deriving, using the data processor, an aggregate score for the digital content, wherein the aggregate score is derived from the raw scores;
   grouping, using the data processor, other users of the social networking site that frequently communicate with the primary user and with each other into an associated user group;
   determining, using the data processor, a property of the associated user group;
   adjusting, using the data processor, the aggregate score according to a determined property of the associated user group to form an adjusted aggregate score; and
   using the adjusted aggregate score to output a classification of the digital content.

2. The method of claim 1, wherein the classification includes an indication of a level of objectionable content within the digital content.

3. The method of claim 1, wherein the classification includes an indication of a level of violent content within the digital content.

4. The method of claim 1, wherein the classification includes an indication of a level of pornographic content within the digital content.

5. The method of claim 1, wherein the classification includes an indication of a level of abusive content within the digital content.

6. A method for classifying digital content, wherein the digital content includes two or more items, the method comprising:
   identifying a grouping of the two or more items in the digital content;
   assigning a raw score to the identified items based on predetermined criteria;
   deriving an aggregate score for the digital content, wherein the aggregate score is derived from the raw scores; and
   using the aggregate score to output a classification of the digital content wherein the classification includes an indication of a level of proprietary content within the digital content.

7. The method of claim 1 where grouping further comprises identifying friends of the primary user.

8. The method of claim 1 where grouping further comprises assessing the amount of traffic or exchanges between users.

9. The method of claim 1 where the property indicates whether a user in the associated user group has posted objectionable content.

10. The method of claim 1 wherein the item includes a visual presentation and the visual presentation includes a plurality of images.

11. The method of claim 10, wherein the plurality of images comprises a video.

12. The method of claim 10, wherein the plurality of images comprises an animation.

13. The method of claim 1, wherein the items are included in a level.

14. The method of claim 13, wherein a level includes a web page.

15. The method of claim 13, wherein a level includes a post by a user.

16. The method of claim 1, further comprising:
   weighting one or more of the raw scores in order to derive the aggregate score.

17. The method of claim 1, further comprising:
   wherein the aggregate score is used to derive a category score.

18. The method of claim 17, wherein the category score is derived for a web page.

19. The method of claim 17, wherein the category score is derived for a uniform resource locator (URL) address.

20. A method for classifying digital content, wherein the digital content includes two or more items, the method comprising:
- identifying a grouping of the two or more items in the digital content;
- assigning a raw score to the identified items based on predetermined criteria;
- deriving an aggregate score for the digital content, wherein the aggregate score is derived from the raw scores; and
- using the aggregate score to output a classification of the digital content wherein the aggregate score is used to derive a category score and wherein the category score is derived for a user account.

21. The method of claim 17, wherein the category score is derived for a web page.

22. The method of claim 1, further comprising:
- deriving one or more of the raw scores by using voting results from a user community.

23. The method of claim 1, further comprising:
- deriving one or more of the raw scores by using flagging from a user community.

24. The method of claim 1, further comprising:
- deriving one or more of the raw scores by using information from multiple websites.

25. An apparatus for classifying digital content uploaded to the user base of a social networking site by users of the social networking site, wherein the digital content includes two or more items, the apparatus comprising:
- a digital processor;
- a machine-readable storage medium including one or more instructions executable by the processor for:
  - identifying a grouping of the two or more items in the digital content;
  - assigning a raw score to the identified items based on predetermined criteria;
  - deriving an aggregate score for the digital content, wherein the aggregate score is derived from the raw scores;
  - grouping other users of the social networking site that frequently communicate with the primary user and with each other into an associated user group;
  - determining a property of the associated user group;
  - adjusting the aggregate score according to a determined property of the associated user group to form an adjusted aggregate score; and
  - using the adjusted aggregate score to output a classification of the digital content.

26. A non-transitory machine-readable storage medium including instructions for classifying digital content uploaded to the user base of a social networking site by users of the social networking site, wherein the digital content includes two or more items, the machine-readable storage medium comprising one or more instructions for:
- identifying a grouping of the two or more items in the digital content;
- assigning a raw score to the identified items based on predetermined criteria;
- deriving an aggregate score for the digital content, wherein the aggregate score is derived from the raw scores;
- grouping other users of the social networking site that frequently communicate with the primary user and with each other into an associated user group;
- determining a property of the associated user group;
- adjusting the aggregate score according to a determined property of the associated user group to form an adjusted aggregate score; and
- using the adjusted aggregate score to output a classification of the digital content.

* * * * *